US 8,798,118 B2

(12) United States Patent
Mo

(10) Patent No.: US 8,798,118 B2
(45) Date of Patent: Aug. 5, 2014

(54) RECEIVER FOR REAL TIME LOCATING SYSTEM AND METHOD OF RECEIVING SIGNAL IN REAL TIME LOCATING SYSTEM

(75) Inventor: Sang Hyun Mo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 288 days.

(21) Appl. No.: 12/886,698

(22) Filed: Sep. 21, 2010

(65) Prior Publication Data

US 2011/0150046 A1    Jun. 23, 2011

(30) Foreign Application Priority Data

Dec. 18, 2009   (KR) ........................ 10-2009-0126970

(51) Int. Cl.
*H04B 1/00* (2006.01)
(52) U.S. Cl.
USPC ........... 375/148; 375/147; 375/139; 375/130; 375/316; 375/219; 370/335; 370/342
(58) Field of Classification Search
USPC ................. 375/148, 147, 139, 130, 316, 219; 370/335, 342
See application file for complete search history.

(56) References Cited

U.S. PATENT DOCUMENTS 5,268,927 A * 12/1993 Dimos et al. .................. 375/147
5,377,225 A * 12/1994 Davis ............................ 370/342
6,507,603 B1 * 1/2003 Haga et al. .................... 375/147

FOREIGN PATENT DOCUMENTS

| KR | 2001-0073986 | 8/2001 |
|----|---|---|
| KR | 10-2002-0046305 | 6/2002 |
| KR | 10-2005-0096980 | 10/2005 |
| KR | 10-2005-0109070 | 11/2005 |
| KR | 10-2008-0036235 | 4/2008 |
| KR | 10-2008-0046886 | 5/2008 |
| KR | 10-0833684 | 5/2008 |
| KR | 10-2008-0104560 | 12/2008 |
| WO | 03/075497 | 9/2003 |
| WO | 2007/022626 | 3/2007 |

OTHER PUBLICATIONS

J.S. Cha et at., "Technology Trend of Active RFID-Based Real-Time Locating Systems", Oct. 5, 2009, vol. 24, pp. 87-97.
Xiaowen Chen et at., "Adaptive Narrow-band Interference Suppression in a DSSS System Using Parameter Estimation", 2002 IEEE, pp. 238-242.

* cited by examiner

*Primary Examiner* — Zewdu Kassa
(74) *Attorney, Agent, or Firm* — Staas and Halsey LLP

(57) ABSTRACT

Provided are a receiver for a real time locating system (RTLS) and a method of receiving a signal in the RTLS. The receiver includes a down converter converting a radio frequency (RF) signal into a base band signal, a matched filter filtering the converted signal using an optimal receiving filter in view of a signal-to-noise ratio (SNR) such as a shaping filter used for a transmitter, an adaptive transversal filter (ATF) estimating an interference signal with an output of the matched filter, and filtering the output to remove interference of a heterogeneous signal of the same frequency band, a de-spreader multiplying an output of the matched filter and a code according to DSSS modulation used for spreading when a tag signal is modulated, and performing chip-matched filtering to obtain a value of correlation energy, and a detector detecting original transmission data using the correlation energy value.

7 Claims, 5 Drawing Sheets

RECEIVER FOR REAL TIME LOCATING SYSTEM AND METHOD OF RECEIVING SIGNAL IN REAL TIME LOCATING SYSTEM

CROSS-REFERENCE TO RELATED APPLICATION

This application claims priority to and the benefit of Korean Patent Application No. 10-2009-0126970, filed Dec. 18, 2009, the disclosure of which is incorporated herein by reference in its entirety.

BACKGROUND

1. Field of the Invention

The present invention relates to a receiver for a real time locating system (RTLS) using active radio frequency identification (RFID) and a method of receiving a signal in the RTLS, and more particularly, to a technique for removing interference of a heterogeneous signal of the same frequency band from an RTLS reader. Particularly, the present invention relates to realization of an adaptive transversal filter (ATF) for reducing the impossibility or errors of communication caused by interference between heterogeneous signals of the same frequency band of 2.4 GHz in the structure of an RTLS receiver.

2. Discussion of Related Art

Referring FIG. 1A, the available frequency band of an RTLS is a 2.4 GHz industrial, scientific and medical (ISM) frequency band. This frequency band is the same as that used in wireless local area network (WLAN), Bluetooth, or the like, and is used by many wireless instruments. In particular, an RTLS reader, a receiver of the RTLS requires constant power, which imposes restrictions on installation conditions of the RTLS reader. Generally, various wireless instruments coexist around a place where the constant power is supplied. This causes problems of a decrease in performance, information loss caused by errors, etc. due to an influence of reception of an unnecessary signal.

A transmission signal transmitted from an RTLS tag is modulated using direct sequence spread spectrum (DSSS) modulation. Referring to FIG. 1B, the DSSS modulation has high resistance to signal interference due to a processing gain. However, in the case of relatively high signal interference as in FIG. 1C, its influence renders location of the RTLS tag impossible or causes a great error.

SUMMARY OF THE INVENTION

The present invention is directed to a receiver for a real time locating system (RTLS), in which an adaptive transversal filter (ATF) is used to effectively remove an interference signal of the same frequency band, thereby enhancing accuracy in locating an RTLS tag and also removing restrictions on the installation place of an RTLS reader.

One aspect of the present invention is to provide a receiver for an RTLS, which includes: a down converter converting a signal into a base band signal; a matched filter matched-filtering the converted base band signal; an ATF estimating an interference signal with an output of the matched filter, and filtering the output to remove interference of a heterogeneous signal of the same frequency band; a de-spreader multiplying an output of the ATF and a code used for spreading when a tag signal is modulated, and performing chip-matched filtering to obtain a value of correlation energy; and a detector detecting data from the correlation energy value.

In exemplary embodiments, the ATF may include a finite impulse response (FIR) filter and a weight generator. The FIR filter may meet Equations 1 and 2 as follows:

$$x_e(k) = \sum_{j=-N_D}^{N_D} W_{j,k} x(k+N_D) \qquad \text{Equation 1}$$

$$y(k) = x(k) + x_e(k) \qquad \text{Equation 2}$$

where $x_e(k)$ is the k-th value obtained by estimating the interference signal, $x(k)$ is the k-th value input into the FIR filter, $y(k)$ is the k-th value from which the interference signal is removed, $W_{j,k}$ is the j-th weight corresponding to the k-th input value, and $N_D$ is the number of taps of an equalizer filter.

In exemplary embodiments, the weight generator may meet Equation 3 as follows:

$$W_{N,k+1} = W_{N,k} + c(k) y(k) x(k+N)$$

$$c(k) = 2\mu / [1 + 2\mu \bar{x}^T(k) \bar{x}(k)] \qquad \text{Equation 3}$$

where, $x(k)$ is the k-th value input into the FIR filter, $y(k)$ is the k-th value from which the interference signal is removed, $W_{N,k}$ is the N-th weight corresponding to the k-th input value, $\mu$ is the adaptive constant, $\bar{x}(k)$ is the vector, $(2N+1) \times 1$, made by N input signals in each of forward and backward directions with respect to the k-th input signal $x(k)$, and $\bar{x}^T(k)$ is the vector, $1 \times (2N+1)$, obtained by transposing the vector $\bar{x}(k)$.

Another aspect of the present invention is to provide a method of receiving a signal in an RTLS. The method includes: converting the signal into a base band signal; matched-filtering the converted base band signal to be matched at a transmitter; estimating an interference signal with the matched-filtered signal, and filtering the matched-filtered signal to remove interference of a heterogeneous signal of the same frequency band; and de-spreading the signal from which the interference is removed to detect transmission data.

BRIEF DESCRIPTION OF THE DRAWINGS

The above and other features and advantages of the present invention will become more apparent to those of ordinary skill in the art by describing in detail preferred embodiments thereof with reference to the attached drawings in which.

DETAILED DESCRIPTION OF PREFERRED EMBODIMENTS

Figure 1A:
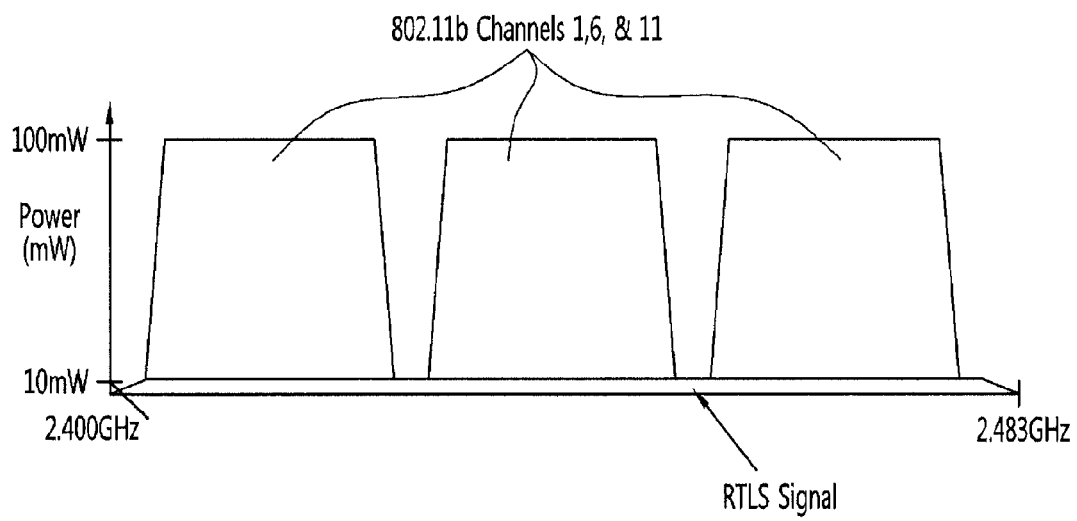
FIGS. 1A through 1C are conceptual views illustrating a problem of real time location system (RTLS) direct sequence spread spectrum (DSSS) transmission.
Figure 1B:
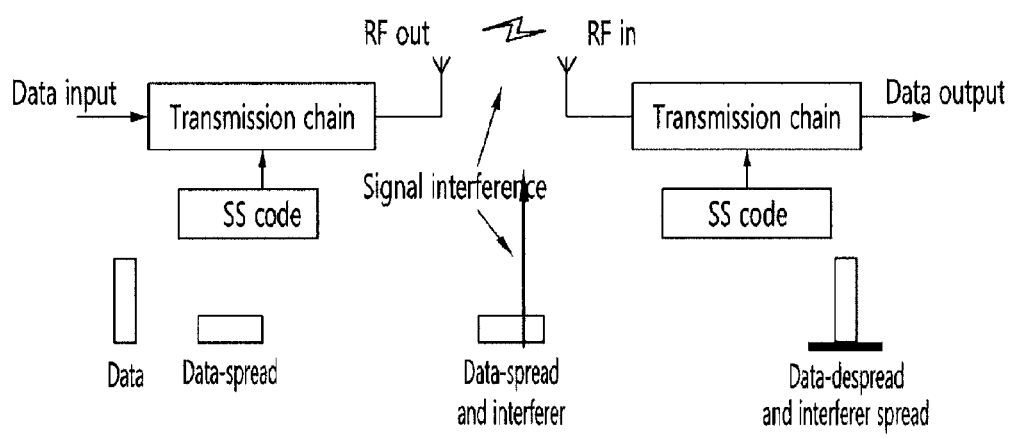
Figure 1C:
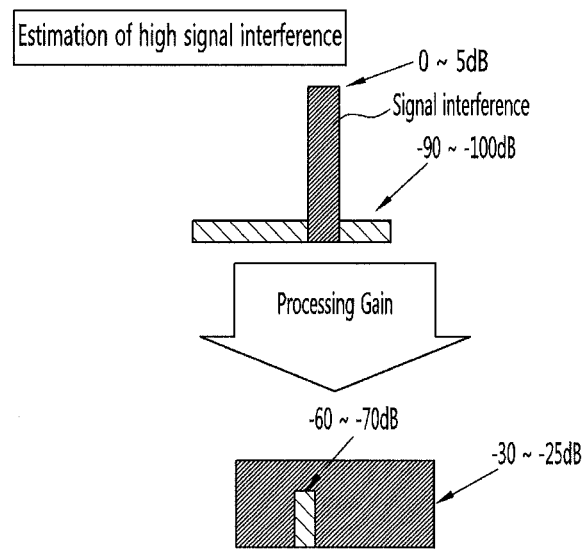

Hereinafter, an exemplary embodiment of the present invention will be described in detail with reference to the accompanying drawings. Here, the terminology or words used in the specification and the claims of the present invention should not be interpreted as typical meanings or lexical meanings, and they should be interpreted as the meaning and concept conforming to the technological idea of the present invention on the basis of the idea that the inventor can define the concept of the words appropriately in order to illustrate his invention in the best manner.

Therefore, embodiments described herein and configurations illustrated in the drawings are merely the most exemplary embodiments of the present invention, but not substitutes all of the technical spirits of the present invention. So, it should be understood that various equivalents or modifications could substitute the embodiments at a time point of the application of the present invention.

Figure 2:
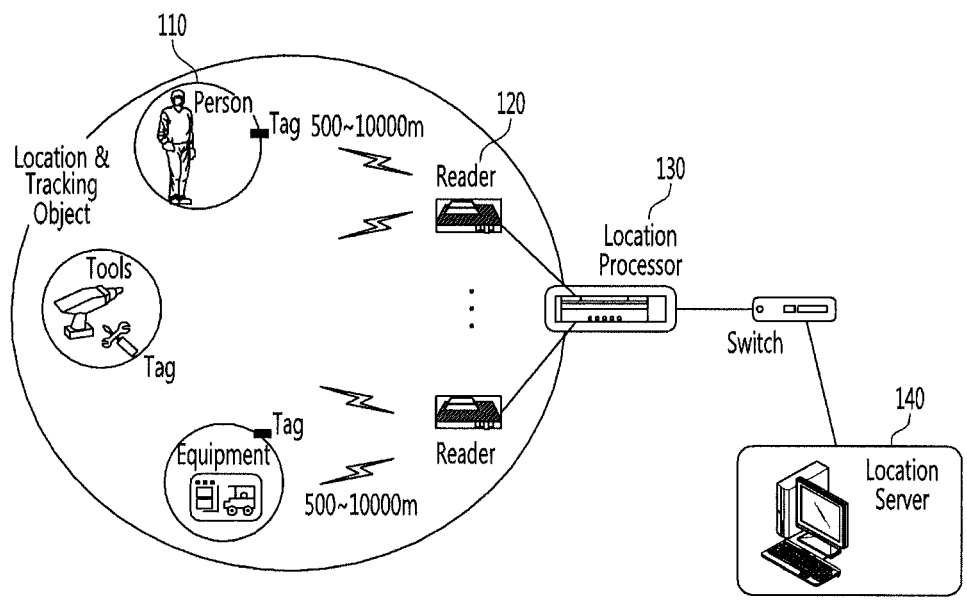
FIG. 2 is a conceptual view illustrating an RTLS in accordance with an exemplary embodiment of the present invention.

FIG. 2 is a conceptual view illustrating a real time location system (RTLS) according to an exemplary embodiment of the present invention. The RTLS according to an exemplary embodiment of the present invention includes an RTLS tag 110 outputting a message frame conforming to international standard ISO/IEC 24730-2, a plurality of RTLS readers 120 installed at different locations and receiving a transmission message from each tag, and a location processor 130 analyzing the location of one tag using radiodetermination when at least three transmission messages are received from the tag through the RTLS readers 120.

The RTLS is a location and tracking system using active radio frequency identification (RFID), and complies with international standard ISO/IEC 24730-2. The active RTLS tag 110 periodically transmits a transmission signal including its own tag ID and other information. Each RTLS reader 120 receives the transmission signal to hand over a value of arrival time information required for location calculation to the location processor 130. To perform the location calculation on one tag 110, the arrival time information received from at least three of the RTLS readers is required. The location processor 130 performs the location calculation by applying a time difference of arrival (TDoA) algorithm to the received arrival time information. In detail, at least three of the RTLS readers 120 are configured to simultaneously recognize one tag, and a distance between each RTLS reader 120 and one tag 110 is measured. These distances are calculated by triangulation, thereby tracking the location of the tag. A location server 140 provides service suitable for application using the calculated location coordinates.

Figure 3:
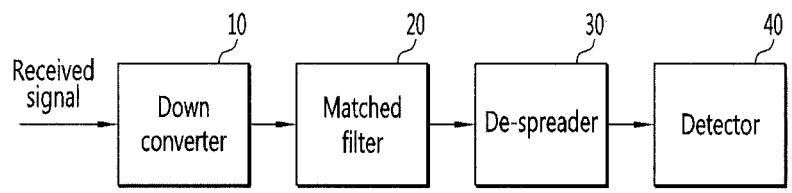
FIG. 3 is a block diagram illustrating the structure of an RTLS receiver.

FIG. 3 is a block diagram illustrating the structure of an RTLS receiver acting as an RTLS reader according to an exemplary embodiment of the present invention.

The RTLS receiver of FIG. 3 employs direct sequence spread spectrum (DSSS) modulation. As illustrated in FIG. 3, the receiver includes a down converter 10 converting an RF signal into a base band signal, a matched filter 20 filtering the converted signal using an optimal receiving filter in view of a signal-to-noise ratio (SNR) such as a shaping filter used for a transmitter, a de-spreader 30 multiplying an output of the matched filter 20 and a code according to DSSS modulation used for spreading when a tag signal is modulated, and performing chip-matched filtering to obtain a value of correlation energy, and a detector 40 detecting original transmission data using the correlation energy value. However, in the structure of the receiver of FIG. 3, influence of a heterogeneous signal using the same frequency band is not taken into consideration.

An RTLS tag performs a spreading process with a code that has already been stipulated. A tag signal used in the RTLS uses the DSSS modulation. The DSSS modulation spreads a transmission signal with a code such as an m-sequence used in code division multiple access (CDMA). The code used for spreading is defined in an RTLS-related international standard, ISO/IEC 24730-2.

In contrast, the de-spreader 30 performs a de-spreading process with a code that has already been stipulated. To receive the transmission signal at the receiver, the transmission signal needs to be de-spread with the code used for the spreading by the tag. If the transmission signal is spread with a different code, the receiver cannot demodulate the transmission signal. The chip-matched filtering refers to a process of the receiver obtaining the correlation energy value through the de-spreading process.

Figure 4:
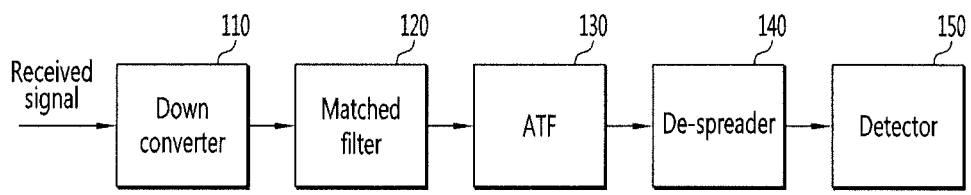
FIG. 4 is a block diagram illustrating the structure of an RTLS receiver to which an adaptive transversal filter (ATF) is added in accordance with an exemplary embodiment of the present invention.

FIG. 4 is a block diagram illustrating the structure of an RTLS receiver to which an adaptive transversal filter (ATF) is added in accordance with an exemplary embodiment of the present invention. An ATF 130 is interposed between a matched filter 120 and a de-spreader 140. The ATF 130 estimates an interference signal with an output of the matched filter 120, and filters the output to remove the interference signal. A detailed structure of the ATF 130 is shown in FIG. 5.

Figure 5:
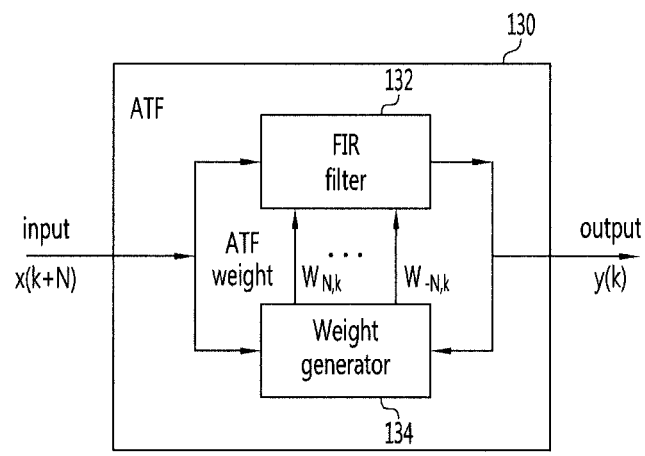
FIG. 5 illustrates the structure of an ATF in accordance with an exemplary embodiment of the present invention.

FIG. 5 illustrates the structure of the ATF 130 in accordance with an exemplary embodiment of the present invention. The ATF 130 includes a finite impulse response (FIR) filter 132 and a weight generator 134.

Figure 6A:
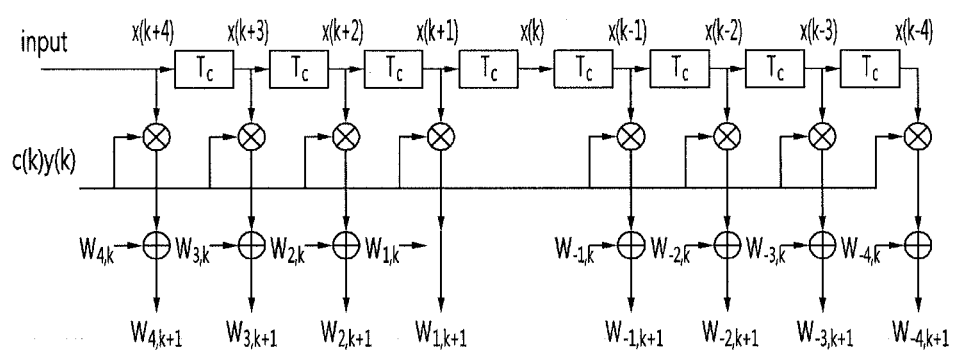
FIG. 6A illustrates a detailed structure of the finite impulse response (FIR) filter illustrated in FIG. 5.

FIG. 6A illustrates a detailed structure of the FIR filter 132 illustrated in FIG. 5. Referring to FIG. 6A, the FIR filter 132 is a two-sided filter having eight taps. The number of taps needs not always be eight, and so may vary as needed. This filter can process a signal in a time domain, and is easily realized to remove a narrowband interference signal due to its simple structure. The operation of the FIR filter is performed by the following equation.

(1) Estimation of Interference Signal  Equation 1

$$x_e(k) = W_{4,k}x(k+4) - W_{3,k}x(k-3) + \ldots + W_{-3,k}x(k-3) + W_{-4,k}x(k-4)$$

(2) Removal of Interference Signal $$y(k) = x(k) + x_e(k)$$

Here, $x_e(k)$ is the k-th value obtained by estimating the interference signal, $x(k)$ is the k-th value input into the FIR filter, $y(k)$ is the k-th value from which the interference signal is removed, and $W_{j,k}$ is the j-th weight corresponding to the k-th input value.

When the number of taps of an equalizer filter is $N_D$, the equation for (1) Estimation of Interference Signal can be generalized as follows.

$$x_e(k) = \sum_{j=-N_D/2}^{N_D/2} W_{j,k}x(k+j)$$

Figure 6B:
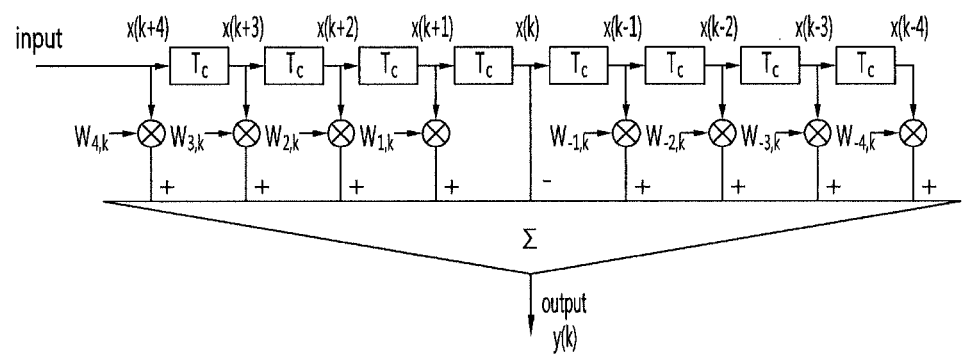
FIG. 6B illustrates a detailed structure of the weight generator illustrated in FIG. 5.

FIG. 6B illustrates a detailed structure of the weight generator illustrated in FIG. 5. Referring to FIG. 6B, the weight generator 134 uses a modified least mean square (LMS) algorithm to make up for a convergence characteristic and generation of a jitter in connection with a step size μ according to an intensity of the interference signal. A method of updating the weight is based on the following equation.

$$W_{N,k+1} = W_{N,k} + c(k)y(k)x(k+N)$$

$$c(k) = 2\mu/[1 + 2\mu \bar{x}^T(k)\bar{x}(k)] \qquad \text{Equation 2}$$

Here, x(k) is the k-th value input into the FIR filter, y(k) is the k-th value from which the interference signal is removed, $W_{N,k}$ is the N-th weight corresponding to the k-th input value, μ is the adaptive constant, $\bar{x}(k)$ is the vector, (2N+1)×1, made by N input signals in each of forward and backward directions with respect to the k-th input signal x(k), and $\bar{x}^T(k)$ is the vector, 1×(2N+1), obtained by transposing the vector $\bar{x}(k)$.

Figure 7:
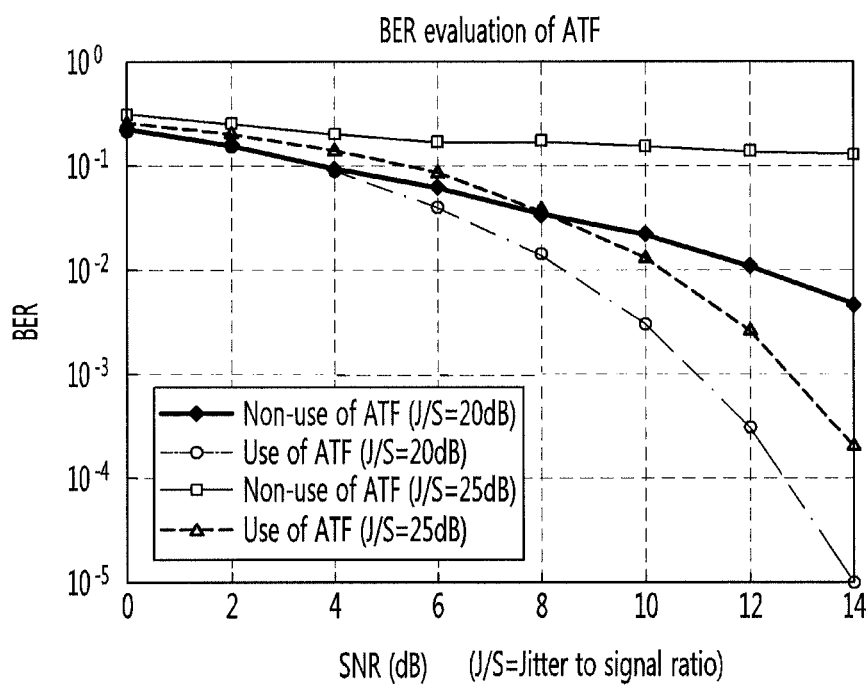
FIG. 7 is a graph showing bit error ratio (BER) performance of an RTLS receiver in accordance with another exemplary embodiment of the present invention.

FIG. 7 is a graph showing bit error ratio (BER) performance of an RTLS receiver in accordance with another exemplary embodiment of the present invention. The graph of FIG. 7 shows performance when an ATF is applied to an RTLS reader according to the aforementioned embodiment. As for the BER performance, the case where an ATF is applied can obtain a gain of 4 dB or more, compared to the case where an ATF is not applied.

As described above, using an ATF, the RTLS system can reduce deterioration of its performance such as communication errors and impossibility caused by interference of a heterogeneous signal. Thus, it is possible to remove restrictions on the installation place of an RTLS reader, and also to enhance accuracy in the location of an RTLS tag.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A receiver for a real time locating system (RTLS), comprising:
   a down converter converting a signal into a base band signal;
   a matched filter matched-filtering the converted base band signal;
   an adaptive transversal filter (ATF) estimating an interference signal with an output of the matched filter, and filtering the output to remove interference of a heterogeneous signal of the same frequency band;
   a de-spreader multiplying an output of the ATF and a code according to direct sequence spread spectrum (DSSS) modulation used for spreading when a tag signal is modulated, and performing chip-matched filtering on the output from the ATF and obtaining a value of correlation energy through a de-spreading process; and
   a detector detecting transmission data using the correlation energy value, where the filtering is implemented according to a weight generated in correspondence with the interference signal estimated and an input value, and the signal is demodulated using the code.

2. The receiver according to claim 1, wherein the ATF includes a finite impulse response (FIR) filter and a weight generator.

3. The receiver according to claim 2, wherein the FIR filter meets Equations 1 and 2 as follows:

$$x_e(k) = \sum_{j=-N_D/2}^{N_D/2} W_{j,k} x(k+j) \qquad \text{Equation 1}$$

$$y(k) = x(k) + x_e(k) \qquad \text{Equation 2}$$

where $x_e(k)$ is the k-th value obtained by estimating the interference signal, x(k) is the k-th value input into the FIR filter, y(k) is the k-th value from which the interference signal is removed, $W_{j,k}$ is the j-th weight corresponding to the k-th input value, and $N_D$ is the number of taps of an equalizer filter.

4. The receiver according to claim 3, wherein the weight generator meets Equation 3 as follows:

$$W_{N,k+1} = W_{N,k} + c(k)y(k)x(k+N)$$

$$c(k) = 2\mu/[1 + 2\mu \bar{x}^T(k)\bar{x}(k)] \qquad \text{Equation 3}$$

where, x(k) is the k-th value input into the FIR filter, y(k) is the k-th value from which the interference signal is removed, $W_{N,k}$ is the N-th weight corresponding to the k-th input value, μ is the adaptive constant, $\bar{x}(k)$ is the vector, (2N+1)×1, made by N input signals in each of forward and backward directions with respect to the k-th input signal x(k), and $\bar{x}^T(k)$ is the vector, 1×(2N+1), obtained by transposing the vector $\bar{x}(k)$.

5. A method of receiving a signal in a real time locating system (RTLS), comprising:
   converting the signal into a base band signal;
   matched-filtering the converted base band signal to be matched at a transmitter;
   estimating an interference signal with the matched-filtered signal, and filtering the matched-filtered signal to remove interference of a heterogeneous signal of the same frequency band; and
   de-spreading the signal from which the interference is removed according to direct sequence spread spectrum (DSSS) modulation of a code used for spreading when a tag signal is modulated to detect transmission data, where the filtering is implemented according to a weight generated in correspondence with the interference signal estimated and an input value and the signal is demodulated using the code.

6. The method according to claim 5, wherein the removing of the interference uses a finite impulse response (FIR) filter and a weight generator, and meets Equations 1 and 2 as follows:

$$x_e(k) = \sum_{j=-N_D/2}^{N_D/2} W_{j,k} x(k+j) \qquad \text{Equation 1}$$

$$y(k) = x(k) + x_e(k) \qquad \text{Equation 2}$$

where $x_e(k)$ is the k-th value obtained by estimating the interference signal, x(k) is the k-th value input into the FIR filter, y(k) is the k-th value from which the interference signal is removed, $W_{j,k}$ is the j-th weight corresponding to the k-th input value, and $N_D$ is the number of taps of an equalizer filter.

7. The method according to claim 6, wherein the weight generator meets Equation 3 as follows:

$$W_{N,k+1} = W_{N,k} + c(k)y(k)x(k+N)$$

$$c(k) = 2\mu/[1 + 2\mu \bar{x}^T(k)\bar{x}(k)] \qquad \text{Equation 3}$$

where, x(k) is the k-th value input into the FIR filter, y(k) is the k-th value from which the interference signal is removed, $W_{N,k}$ is the N-th weight corresponding to the k-th input value, μ is the adaptive constant, $\bar{x}(k)$ is the vector, (2N+1)×1, made by N input signals in each of forward and backward directions with respect to the k-th input signal x(k), and $\bar{x}^T(k)$ is the vector, 1×(2N+1), obtained by transposing the vector.

\* \* \* \* \*